United States Patent
Miller et al.

(10) Patent No.: US 8,295,462 B2
(45) Date of Patent: Oct. 23, 2012

(54) ALERTING A PARTICIPANT WHEN A TOPIC OF INTEREST IS BEING DISCUSSED AND/OR A SPEAKER OF INTEREST IS SPEAKING DURING A CONFERENCE CALL

(75) Inventors: Steven Michael Miller, Cary, NC (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 12/044,945

(22) Filed: Mar. 8, 2008

(65) Prior Publication Data

US 2009/0225971 A1  Sep. 10, 2009

(51) Int. Cl.
*H04M 3/56* (2006.01)
*H04N 7/15* (2006.01)
*H04L 12/18* (2006.01)
*G06F 15/16* (2006.01)
*G10L 17/00* (2006.01)

(52) U.S. Cl. ............... 379/202.01; 348/14.08; 370/260; 370/261; 370/262; 379/203.01; 455/416; 704/246; 704/247; 709/204

(58) Field of Classification Search ............... 348/14.08, 348/14.09, 14.1; 370/260–270; 379/88.01, 379/88.02; 704/270, 231, 246, 247; 709/204, 205; 455/416

See application file for complete search history.

(56) References Cited

U.S. PATENT DOCUMENTS

| | | | |
|---|---|---|---|
| 6,304,648 B1 | 10/2001 | Chang | 379/202.01 |
| 6,628,767 B1 | 9/2003 | Wellner et al. | 379/202.01 |
| 6,810,116 B1 * | 10/2004 | Sorensen et al. | 379/202.01 |
| 6,853,716 B1 * | 2/2005 | Shaffer et al. | 379/202.01 |
| 6,865,264 B2 * | 3/2005 | Berstis | 379/202.01 |
| 7,020,257 B2 * | 3/2006 | Li | 379/202.01 |
| 7,305,078 B2 * | 12/2007 | Kardos | 379/202.01 |
| 7,792,263 B2 * | 9/2010 | D'Amora et al. | 379/202.01 |
| 8,019,069 B1 * | 9/2011 | Cyriac et al. | 379/202.01 |
| 2004/0184568 A1 * | 9/2004 | Kobylinski et al. | 375/341 |
| 2008/0233933 A1 * | 9/2008 | Gilbert et al. | 455/416 |

* cited by examiner

*Primary Examiner* — Harry Hong
(74) *Attorney, Agent, or Firm* — Robert A. Voigt, Jr.; Winstead, P.C.

(57) ABSTRACT

A method, system and computer program product for alerting a participant when a topic of interest is being discussed and/or a speaker of interest is speaking during a conference call. A participant to a conference call identifies the topics and/or speakers of interest which is stored for future use along with the participant's contact information. When a participant's identified topic of interest is being discussed and/or a participant's identified speaker of interest is speaking during a conference call, the participant will be alerted to that fact, such as via the means specified in the participant's contact information.

18 Claims, 4 Drawing Sheets

ALERTING A PARTICIPANT WHEN A TOPIC OF INTEREST IS BEING DISCUSSED AND/OR A SPEAKER OF INTEREST IS SPEAKING DURING A CONFERENCE CALL

TECHNICAL FIELD

The present invention relates to teleconference systems, and more particularly to alerting a participant when a topic of interest is being discussed and/or a speaker of interest is speaking during a conference call.

BACKGROUND OF THE INVENTION

Teleconference systems, or simply "conference call systems," bring multiple parties together from remote locations. Ideally, teleconference systems allow participants to communicate with each other as if they were seated in the same room. A teleconference system includes at least two stations (e.g., mobile telephone, landline telephone) set up in remote rooms or locations interconnected by a transmission system, such as a global network or a telephone system.

Participants at each of the stations communicate with each other through audio equipment. Audio equipment for each station typically includes one or more microphones, speakers, and the like.

People are busier than ever today and oftentimes do not have time to attend the entire conference call. Due to lack of time, people may only be interested in attending a portion of the conference call when a particular topic is discussed or when a particular speaker is speaking. However, there is currently no means for alerting a participant when a topic of interest is being discussed or when a speaker of interest is speaking.

BRIEF SUMMARY OF THE INVENTION

In one embodiment of the present invention, a method for alerting a participant when a topic of interest is being discussed and/or a speaker of interest is speaking during a conference call, the method comprises receiving a list of planned topics and/or speakers for a conference call. The method further comprises joining a participant to the conference call. Further, the method comprises providing an agenda to the participant to select topics and/or speakers of interest. Additionally, the method comprises requesting the participant to identify any topics and/or speakers of interest from the agenda. In addition, the method comprises obtaining the participant's indicated topics and/or speakers of interest. Further, the method comprises alerting the participant when one of the participant's indicated topics and/or speakers of interest is being discussed and/or spoken during the conference call.

In another embodiment of the present invention, a method for alerting a participant when a speaker of interest is speaking during a conference call comprises receiving an identified speaker of interest from a participant. The method further comprises detecting a voice on a telephone line of the identified speaker of interest. Additionally, the method comprises alerting the participant that the identified speaker of interest is speaking.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for alerting a participant when a topic of interest is being discussed and/or a speaker of interest is speaking during a conference call. In one embodiment of the present invention, a participant to a conference call identifies the topics and/or speakers of interest which is stored for future use along with the participant's contact information. When a participant's identified topic of interest is being discussed and/or a participant's identified speaker of interest is speaking during a conference call, the participant will be alerted to that fact, such as via the means specified in the participant's contact information.

While the following discusses the present invention in connection with implementing a conference bridge, the principles of the present invention may be implemented in connection with live streaming or broadcasting over a computer network without the requirement of a conference bridge. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
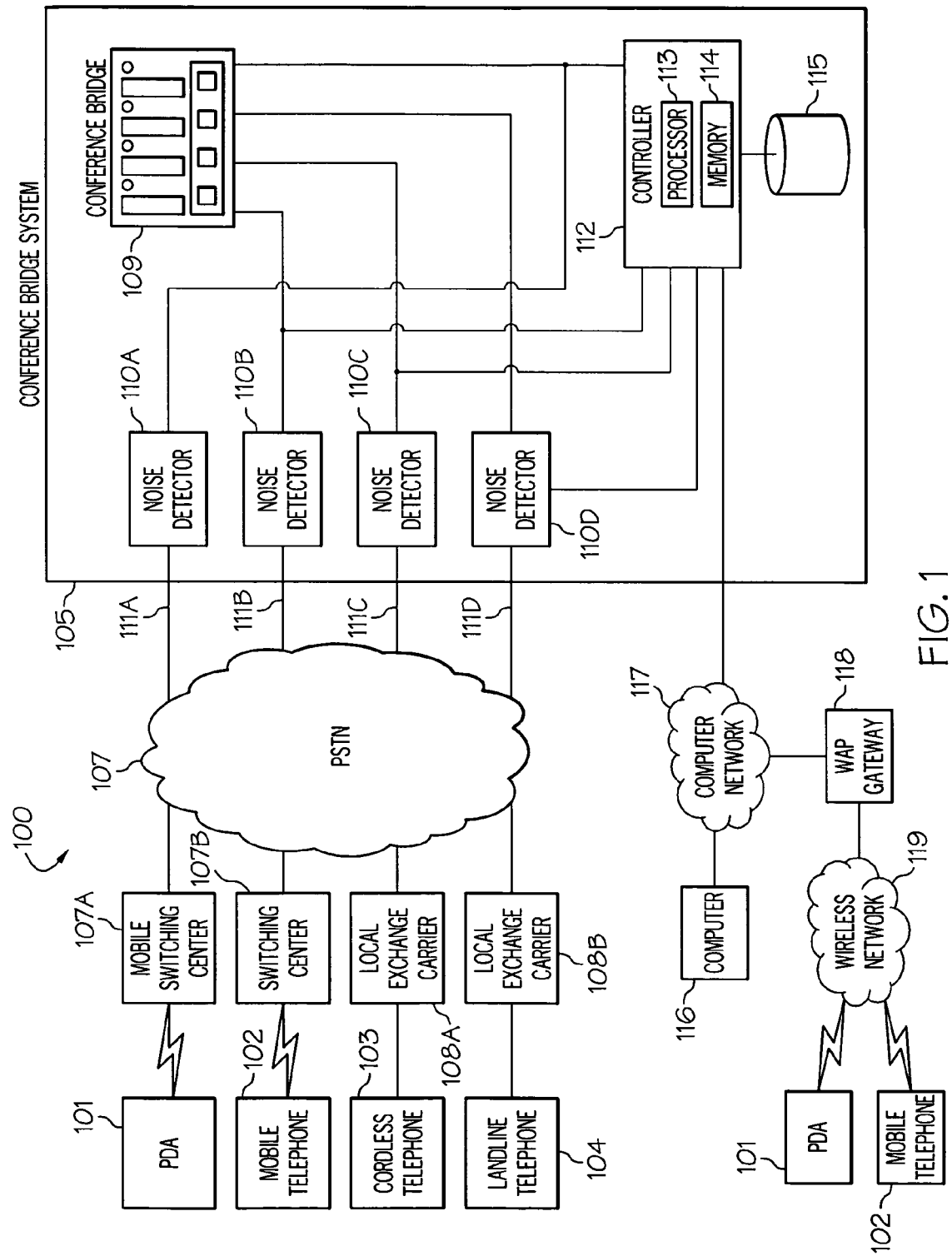
FIG. 1 illustrates a teleconference system in accordance with an embodiment of the present invention.

FIG. 1—Teleconference System

FIG. 1 illustrates an embodiment of the present invention of a teleconference system 100. Teleconference system 100 may include one or more Personal Digital Assistants (PDAs) 101, one or more mobile telephones 102, one or more cordless telephones 103 and one or more landline telephones 104.

PDA 101 and mobile telephone 102 may be connected to a conference bridge system 105 via mobile telephone switching centers 106A-B, respectively, and a Public Switched Telephone Network (PSTN) 107. Mobile switching centers 106A-B may collectively or individually be referred to as mobile switching centers 106 or mobile switching center 106, respectively. Mobile telephone switching center 106 connects the landline Public Switched Telephone Network (PSTN) 107 to the mobile phone system. PSTN 107 may be connected to conference bridge system 105.

Similarly, cordless telephone 103 may be connected to a conference bridge system 105 via a local exchange carrier 108A and PSTN 107. Local exchange carrier 108A enables cordless telephone 103 to gain access to conference bridge system 105 via PSTN 107. Further, landline telephone 104 may be connected to a conference bridge system 105 via a local exchange carrier 108B and PSTN 107. Local exchange carrier 108B enables landline telephone 104 to gain access to conference bridge system 105 via PSTN 107. Local exchange carriers 108A-B may collectively or individually be referred to as local exchange carriers 108 or local exchange carrier 108, respectively.

As stated above, teleconference system 100 may include a conference bridge system 105. Conference bridge system 105 may include a conference bridge 109 configured to connect callers of PDAs 101, mobile telephones 102, cordless telephones 103 and landline telephones 104 together, such as on a conference call. Further, conference bridge 109 may be configured to monitor the conference call session as well as electronically balance the lines so that each caller can hear and speak to all the other callers no matter how many people hop on or off the call.

Conference bridge system 105 may further include noise detectors 110A-D configured to monitor and detect noise on the telephone lines 111A-D for PDA 101, mobile telephone 102, cordless telephone 103 and landline telephone 104, respectively. For example, noise detector 110A may monitor and detect noise on telephone line 111A for PDA 101. Noise detector 110B may monitor and detect noise on telephone line 111B for mobile telephone 102. Noise detector 110C may monitor and detect noise on telephone line 111C for cordless telephone 103. Further, noise detector 110D may monitor and detect noise on telephone line 111D for landline telephone 104. Noise detectors 110A-D may collectively or individually be referred to as noise detectors 110 or noise detector 110, respectively. Further, telephone lines 111A-D may collectively or individually be referred to as telephone lines 111 or telephone line 111, respectively.

Additionally, conference bridge system 105 may include a controller 112 coupled to conference bridge 109 and to noise detectors 110. Controller 112 is configured to alert a participant when a topic of interest is being discussed and/or a speaker is speaking during a conference call as discussed herein. Controller 112 may include a processor 113 coupled to a memory 114. Processor 113 may be configured to execute the instructions of the program stored in memory 114. In one embodiment, the program for alerting a participant when a topic of interest is being discussed and/or a speaker is speaking during a conference call, as discussed further below in connection with FIGS. 2-4, may reside in memory 114. In one embodiment, memory 114 may include a program for voice recognition so that the voice of a speaker of interest can be identified.

In addition, conference bridge system 105 may include a database 115 configured to store participant's contact information as well as the participant's identified topics and/or speakers of interest, as discussed further below in connection with FIGS. 2-4. In one embodiment, database 115 stores the participant's contact information as well as the participant's identified topics and/or speakers of interest in a profile for that participant. In one embodiment, database 115 may further store voice patterns of speakers which are used by controller 112 to determine if the voice detected by noise detector 110 matches one of the stored voice patterns as discussed further below in connection with FIG. 4.

Teleconference system 100 may further include a data processing system 116, which runs suitable web browser software, connected to controller 112 via a computer network 117 (e.g., Local Area Network (LAN), such as Ethernet, Token Ring, ARCnet, or a Wide Area Network (WAN), such as the Internet).

Teleconference system 100 may further include a mobile device, which runs suitable web browser software, such as PDA 101 or mobile telephone 102, which is connected to a Wireless Application Protocol (WAP) gateway 118 via a wireless telephone network 119. WAP gateway 111 provides a set of communication protocols enabling wireless devices, such as PDA 101, mobile telephone 102, to access computer network 117.

Teleconference system 100 may include any number of PDAs 101, mobile telephones 102, cordless telephones 103 and landline telephones 104. Further, teleconference system 100 may include any number of mobile devices (e.g., personal digital assistant 101, mobile telephone 102) with the capability of connecting to computer network 117. Additionally, teleconference system 100 may include any number of data processing systems 116. FIG. 1 is illustrative of an embodiment of teleconference system 100 and FIG. 1 is not to be limited in scope to any one particular embodiment.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed in the Background section, people are busier than ever today and oftentimes do not have time to attend the entire conference call. Due to lack of time, people may only be interested in attending a portion of the conference call when a particular topic is discussed or when a particular speaker is speaking. However, there is currently no means for alerting a participant when a topic of interest is being discussed or when a speaker of interest is speaking during a conference call.

Figure 2:
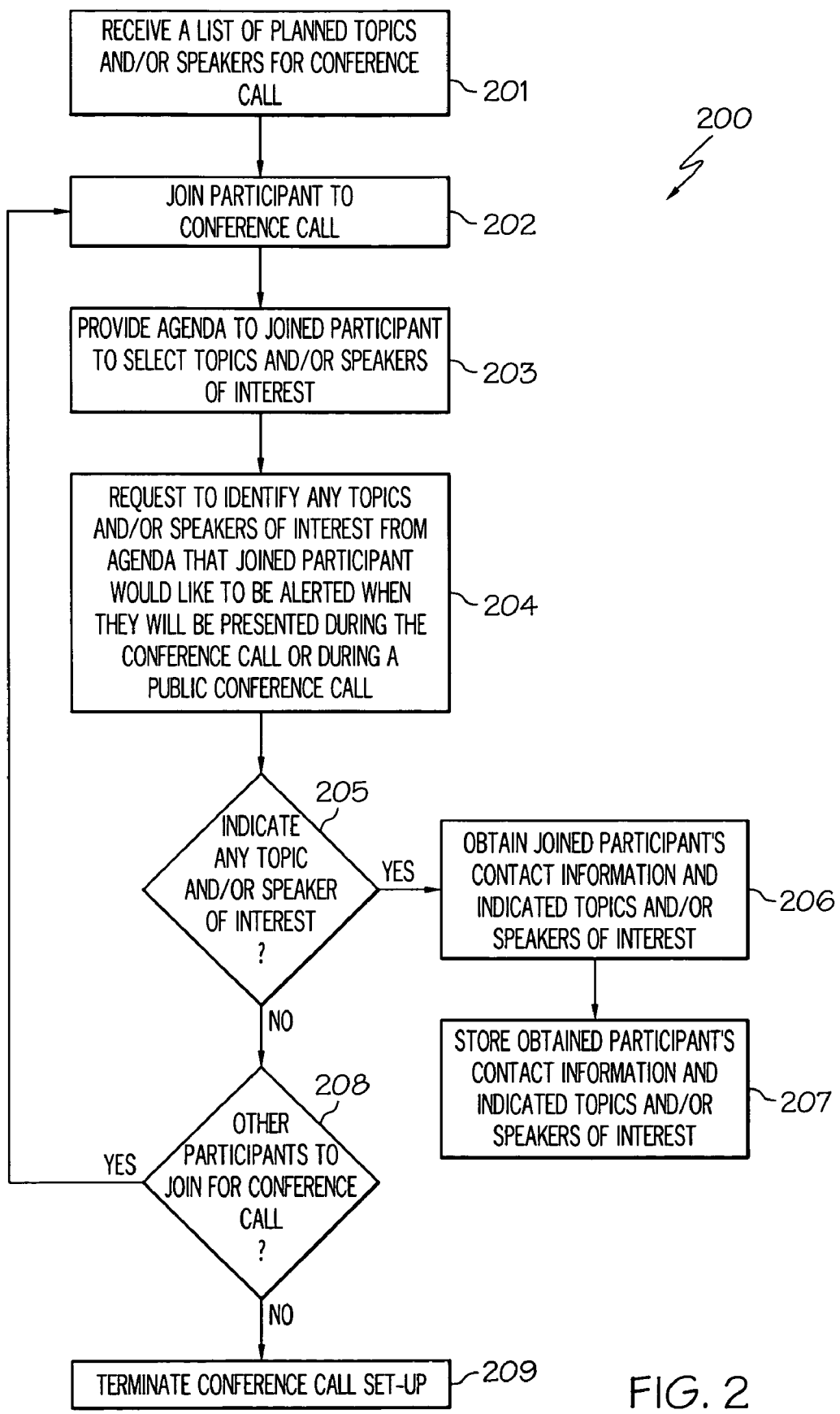
FIG. 2 is a flowchart of a method for joining participants to a conference call and obtaining information from the joined participants in connection with topics and/or speakers of interest in accordance with an embodiment of the present invention.
Figure 3:
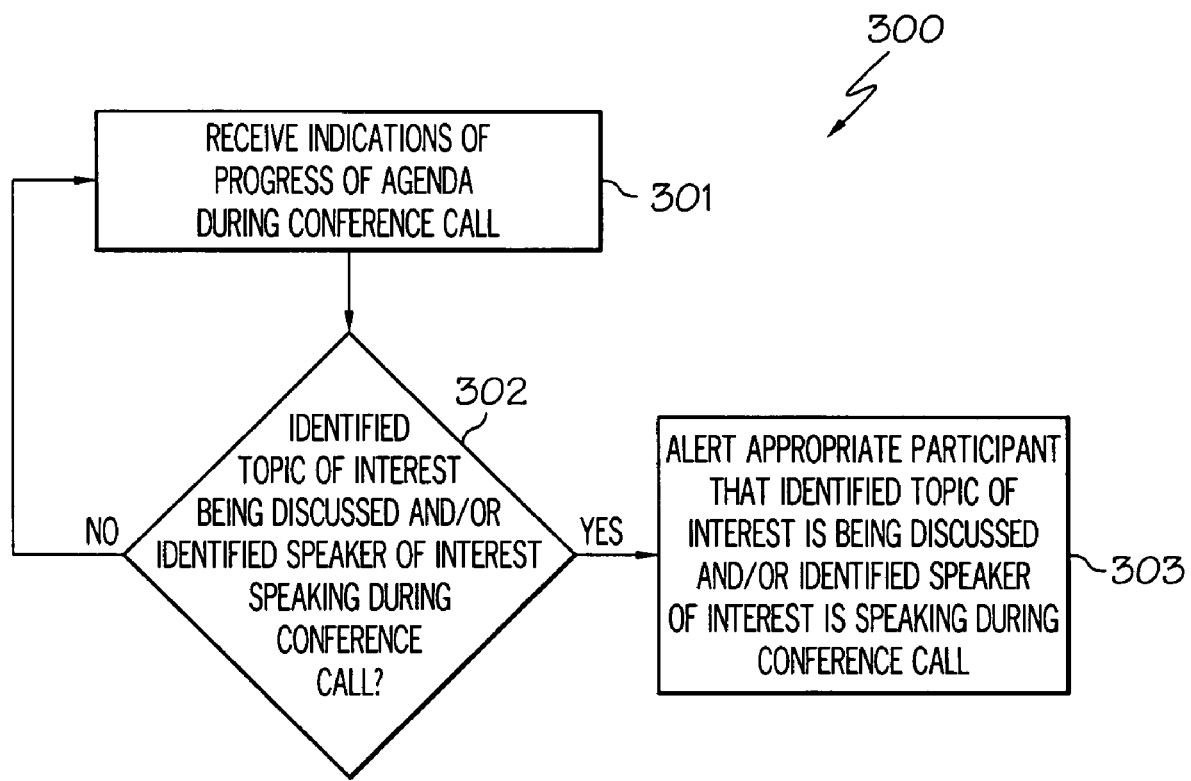
FIG. 3 is a flowchart of a method for alerting a participant when a topic of interest is being discussed and/or a speaker of interest is speaking during a conference call in accordance with an embodiment of the present invention.
Figure 4:
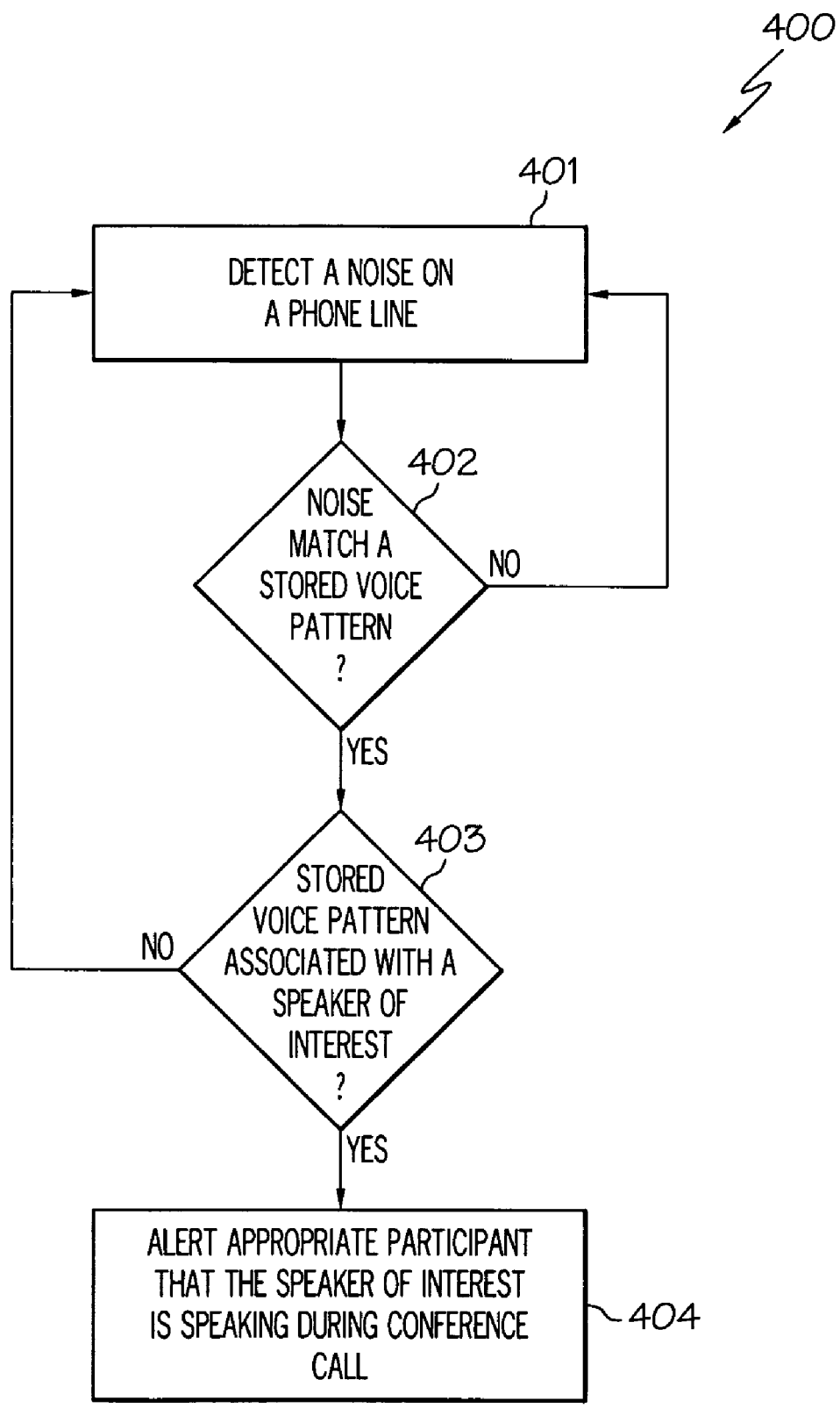
FIG. 4 is a flowchart of an alternative method for alerting a participant when a topic of interest is being discussed and/or a speaker of interest is speaking during a conference call in accordance with an embodiment of the present invention.

As discussed blow in connection with FIGS. 2-4, a participant may be alerted when a topic of interest is being discussed or when a speaker of interest is speaking during a conference call. In this manner, the participant will be able to join the portion of the conference call that is of interest to the participant while saving time in not having to attend the entire conference call. FIG. 2 is a flowchart of a method for joining participants to a conference call and obtaining information from the joined participants in connection with topics and/or speakers of interest. FIG. 3 is a flowchart of a method for alerting a participant when a topic of interest is being discussed and/or a speaker is speaking during a conference call. FIG. 4 is a flowchart of an alternative method for alerting a participant when a topic of interest is being discussed and/or a speaker is speaking during a conference call.

FIG. 2—Method for Joining Participants and Obtaining Information from Joined Participants FIG. 2 is a flowchart of a method 200 for joining participants to a conference call and obtaining information from the joined participants in connection with topics and/or speakers of interest in accordance with an embodiment of the present invention.

Referring to FIG. 2, in conjunction with FIG. 1, in step 201, controller 112 receives from a participant (e.g., moderator) a list of planned topics and/or speakers for a conference call. In one embodiment, the participant (e.g., moderator) inputs the topics to be discussed at the conference call as well as the estimated times these topics will be discussed in a form provided by controller 112. Further, the participant (e.g., moderator) inputs the speakers who will be speaking at the conference call as well as the estimate times these speakers will be speaking in a form provided by controller 112. In one embodiment, the participant (e.g., moderator) transmits the filled-out form electronically over computer network 117 to controller 112. For example, the participant (e.g., moderator) may transmit the filled-out form from computer 116, PDA 101 or from mobile telephone 102.

In step 202, controller 112 joins a participant (e.g., caller of landline telephone 104) to a conference call. In step 203, controller 112 provides an agenda to the joined participant to select the topics and/or speakers of interest to the joined participant. In one embodiment, controller 112 provides the agenda to the joined participant over computer network 117. For example, if the joined participant used a mobile device with web browsing software to join the conference call, then the joined participant may receive the agenda on the participant's PDA 101 or mobile telephone 102. Alternatively, if the joined participant did not use a device with web browsing software to join the conference call, then the joined participant may receive the agenda on data processing system 116. In one embodiment, the agenda provided by the joined participant is based on the information (e.g., list of planned topics and/or speakers and corresponding times) received from the participant (e.g., moderator) in step 201.

In step 204, controller 112 requests the joined participant to identify any topics of interest and/or speakers of interest from the agenda that the joined participant would like to be alerted to when they (topics of interest and/or speakers of interest) will be presented during the conference call or during a public conference call. A public conference call, as used herein, may refer to any conference call that discusses the identified topic of interest or that includes the speaker of interest. In one embodiment, controller 112 instructs conference bridge 109 to generate speech signals requesting the joined participant to identify any topics and/or speakers of interest from the agenda that the joined participant would like to be alerted to when they will be presented during the conference call or during public conference call. Alternatively, controller 112 may send such a request electronically over computer network 117.

In step 205, controller 112 determines whether the joined participant indicated any topic and/or speaker of interest. If controller 112 indicated a topic and/or speaker of interest, then, in step 206, controller 112 obtains the joined participant's contact information (e.g., phone number, e-mail address) and indicated topics and/or speakers of interest. In step 207, controller 112 stores the obtained contact information and indicated topics and/or speakers of interest. In one embodiment, controller 112 stores such information in database 115.

If the joined participant did not indicate to be alerted to any topic and/or speaker of interest, then, in step 208, controller 112 determines if there are other participants to be joined for the conference call. If there are other participants to be joined for the conference call, then controller 112 waits to join the next participant to the conference call in step 202.

If all the participants have joined the conference call, then, in step 209, controller 112 terminates the conference call set-up.

Method 200 may include other and/or additional steps that, for clarity, are not depicted. Further, method 200 may be executed in a different order presented and that the order presented in the discussion of FIG. 2 is illustrative. Additionally, certain steps in method 200 may be executed in a substantially simultaneous manner or may be omitted.

A discussion of alerting a participant when a topic of interest is discussed and/or a speaker of interest is speaking during a conference call is provided below in connection with FIG. 3.

FIG. 3—Method for Alerting a Participant when a Topic of Interest is Discussed and/or a Speaker of Interest is Speaking During a Conference Call FIG. 3 is a flowchart of a method 300 for alerting a participant when a topic of interest is discussed and/or a speaker of interest is speaking during a conference call in accordance with an embodiment of the present invention.

Referring to FIG. 3, in conjunction with FIG. 1, in step 301, controller 112 receives indications of the progress of the agenda during the conference call from the participant (e.g., moderator) that provided the list of planned topics and/or speakers for the conference call in step 201 (FIG. 2). For example, the participant (e.g., moderator) that provided the list of planned topics and/or speakers for the conference call in step 201 (FIG. 2) may send electronic updates of the status of the conference call over computer network 117 to controller 112. For instance, the moderator may indicate the current speaker speaking or the current topic being discussed.

In step 302, based on the progress of the agenda received in step 201 (FIG. 2), controller 112 determines whether a topic of interest identified by a joined participant is being discussed or whether a speaker of interest identified by a joined participant is speaking during the conference call. In one embodiment, the topics of interests and/or speakers of interest identified by the participants of the conference call are stored in database 115. These are used by controller 112 to determine if a topic of interest is being discussed or if a speaker of interest is speaking during the conference call based on the progress of the agenda received in step 201 (FIG. 2).

If there is a topic of interest being discussed or a speaker of interest speaking during the conference call, then, in step 303, controller 112 alerts to the appropriate participant that the topic of interest is being discussed and/or a speaker of interest is speaking during the conference call. It is noted that the conference call referred to in step 303 may include both a "public" conference call, where the participant has not necessarily joined, as well as the conference call that the participant has joined.

Controller 112 may alert the appropriate participant in many manners, such as via electronic mail, an electronic instant message, an automated phone call, a short message service (SMS) message, a page, etc. In one embodiment, database 115 stores profiles for each participant which includes the participant's topics and/or speakers of interest as well as the participant's contact information. The appropriate participant is alerted since the participant's contact information is associated with the topics and/or speakers of interest. Further, the appropriate participant may be alerted in the manner as provided in the participant's contact information.

If, however, there is not a topic of interest being discussed and there is not a speaker of interest speaking during the conference call, then, controller 112, in step 301, receives the next indication of the progress of the agenda during the conference call from the participant (e.g., moderator) that provided the list of planned topics and/or speakers for the conference call in step 201 (FIG. 2).

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

A discussion of an alternative form of alerting a participant when a topic of interest is discussed and/or a speaker of interest is speaking during a conference call is provided below in connection with FIG. 4.

FIG. 4—Alternative Method for Alerting a Participant when a Topic of Interest is Discussed and/or a Speaker of Interest is Speaking During a Conference Call FIG. 4 is a flowchart of an alternative method 400 for alerting a participant when a topic of interest is discussed and/or a speaker of interest is speaking during a conference call in accordance with an embodiment of the present invention.

Referring to FIG. 4, in conjunction with FIG. 1, in step 401, noise detector 110 detects a noise on phone line 111. In step 402, controller 112 determines whether the detected noise matches a stored voice pattern. In one embodiment, controller 112 includes voice recognition software stored in memory 114 for matching the voice detected by noise detector 110 with a voice profile stored in database 115.

If the voice detected by noise detector 110 does not match a stored voice profile, then noise detector 110 waits to detect another noise on phone line 111 in step 401.

If, however, the voice detected by noise detector 110 matches a stored voice profile, then, in step 403, controller 112 determines if the stored voice profile is associated with a speaker of interest. That is, in step 403, controller 112 determines if noise detector 110 detected the voice of a speaker of interest. In one embodiment, controller 112 may indicate in each profile for each joined participant whether there exists a stored voice profile for a speaker identified by the joined participant. When controller 112 determines that there is a matched voice profile, controller 112 may search through the participants' profiles to determine if any of the participants are interested in being notified of the speaker currently speaking.

If the stored voice profile is associated with a speaker of interest, then, in step 404, controller alerts the appropriate participant that the speaker of interest is speaking during the conference call. It is noted that the conference call referred to in step 404 may include both a "public" conference call, where the participant has not necessarily joined, as well as the conference call that the participant has joined. Controller 112 may alert the appropriate participant in many manners, such as via electronic mail, an electronic instant message, an automated phone call, a page, etc.

If, however, there is not a speaker of interest speaking during the conference call, then noise detector 110 waits to detect another noise on phone line 111 in step 401.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for alerting a participant when a topic of interest is being discussed and/or a speaker of interest is speaking during a conference call, the method comprising:
   receiving a list of planned topics and/or speakers for a conference call;
   joining a participant to said conference call;
   providing an agenda to said participant to select topics and/or speakers of interest;
   requesting said participant to identify any topics and/or speakers of interest from said agenda;
   obtaining said participant's indicated topics and/or speakers of interest;
   alerting, by a controller, said participant when one of said participant's indicated topics and/or speakers of interest is being discussed and/or spoken during said conference call;
   monitoring for a noise on each telephone line for each active participant of said conference call; and
   detecting a voice on a telephone line for one of said active participants associated with a selected speaker of interest.

2. The method as recited in claim 1 further comprising:
   obtaining contact information from said participant.

3. The method as recited in claim 2 further comprising:
   storing said contact information obtained from said participant; and
   storing said topics and/or speakers of interest indicated from said participant.

4. The method as recited in claim 1 further comprising:
   receiving indications of progress of said agenda during said conference call.

5. The method as recited in claim 1 further comprising:
   alerting said participant that said selected speaker of interest is speaking during said conference call.

6. A system, comprising:
   a memory unit for storing a computer program for alerting a participant when a topic of interest is being discussed and/or a speaker of interest is speaking during a conference call; and
   a processor coupled to said memory unit, wherein said processor, responsive to said computer program, comprises:
      circuitry for receiving a list of planned topics and/or speakers for a conference call;
      circuitry for joining a participant to said conference call;
      circuitry for providing an agenda to said participant to select topics and/or speakers of interest;
      circuitry for requesting said participant to identify any topics and/or speakers of interest from said agenda;
      circuitry for obtaining said participant's indicated topics and/or speakers of interest;

circuitry for alerting said participant when one of said participant's indicated topics and/or speakers of interest is being discussed and/or spoken during said conference call; and circuitry for detecting a voice associated with a selected speaker of interest.

7. The system as recited in claim 6, wherein said processor further comprises:

circuitry for obtaining contact information from said participant.

8. The system as recited in claim 7, wherein said processor further comprises:

circuitry for storing said contact information obtained from said participant; and circuitry for storing said topics and/or speakers of interest indicated from said participant.

9. The system as recited in claim 6, wherein said processor further comprises:

circuitry for receiving indications of progress of said agenda during said conference call.

10. The system as recited in claim 6, wherein said processor further comprises:

circuitry for alerting said participant that said selected speaker of interest is speaking during said conference call.

11. A computer program product embodied in a computer readable medium, wherein the medium does not include a propagating signal, for alerting a participant when a topic of interest is being discussed and/or a speaker of interest is speaking during a conference call, the computer program product comprising the programming instructions for:

receiving a list of planned topics and/or speakers for a conference call;

joining a participant to said conference call;

providing an agenda to said participant to select topics and/or speakers of interest;

requesting said participant to identify any topics and/or speakers of interest from said agenda;

obtaining said participant's indicated topics and/or speakers of interest;

alerting said participant when one of said participant's indicated topics and/or speakers of interest is being discussed and/or spoken during said conference call; and detecting a voice associated with a selected speaker of interest.

12. The computer program product as recited in claim 11 further comprising the programming instructions for:

obtaining contact information from said participant.

13. The computer program product as recited in claim 12 further comprising the programming instructions for:

storing said contact information obtained from said participant; and storing said topics and/or speakers of interest indicated from said participant.

14. The computer program product as recited in claim 11 further comprising the programming instructions for:

receiving indications of progress of said agenda during said conference call.

15. The computer program product as recited in claim 11 further comprising the programming instructions for:

alerting said participant that said selected speaker of interest is speaking during said conference call.

16. A method for alerting a participant when a speaker of interest is speaking during a conference call, the method comprising:

receiving an identified speaker of interest from a participant;

detecting a voice on a telephone line of said identified speaker of interest; and alerting, by a controller, said participant that said identified speaker of interest is speaking.

17. A computer program product embodied in a computer readable medium, wherein the medium does not include a propagating signal, for alerting a participant when a speaker of interest is speaking during a conference call, the computer program product comprising the programming instructions for:

receiving an identified speaker of interest from a participant;

detecting a voice on a telephone line of said identified speaker of interest; and alerting said participant that said identified speaker of interest is speaking.

18. A system, comprising:

a memory unit for storing a computer program for alerting a participant when a speaker of interest is speaking during a conference call; and a processor coupled to said memory unit, wherein said processor, responsive to said computer program, comprises:

circuitry for receiving an identified speaker of interest from a participant;

circuitry for detecting a voice on a telephone line of said identified speaker of interest; and circuitry for alerting said participant that said identified speaker of interest is speaking.

* * * * *